United States Patent [19]

Payne

[11] Patent Number: 4,737,617

[45] Date of Patent: Apr. 12, 1988

[54] POWER CONTROL FOR COOKING APPLIANCE WITH TRANSIENT OPERATING MODES

[75] Inventor: Thomas R. Payne, Louisville, Ky.

[73] Assignee: General Electric Company, Louisville, Ky.

[21] Appl. No.: 76,227

[22] Filed: Jul. 22, 1987

[51] Int. Cl.$^4$ .............................................. H05B 1/02
[52] U.S. Cl. ............................ 219/486; 219/485; 219/492; 219/508; 219/510; 307/38; 307/39; 340/588
[58] Field of Search .............................. 219/483–486, 219/492, 490, 494, 497, 501, 412, 413, 493, 508–510, 441, 442; 307/38–41, 117; 323/319, 235, 236; 340/588, 589, 584; 361/100–103

[56] References Cited

U.S. PATENT DOCUMENTS

| | | | |
|---|---|---|---|
| 4,380,698 | 4/1983 | Butts | 219/492 |
| 4,443,690 | 4/1984 | Payne et al. | 219/486 |
| 4,551,618 | 11/1985 | Payne | 219/486 |

Primary Examiner—M. H. Paschall
Attorney, Agent, or Firm—H. Neil Houser; Radford M. Reams

[57] ABSTRACT

A power control system for operating a heating element in a cooking appliance in response to the selection of one of a plurality of user selectable power settings. Approximate heating element temperature information is provided by a heater energy counter. Each power setting has associated with it a corresponding steady state power level and a corresponding predetermined steady state energy count. The steady state energy count is approximately proportional to the steady state operating temperature of the heating element when operated at its corresponding steady state power level. The energy counter is selectively incremented and decremented to approximately track the heating element temperature when the count is respectively less than or greater than the steady state count for the applied power level. At least certain ones of the power settings have corresponding minimum threshold counts less than the steady state counts and maximum threshold counts greater than the steady state counts. To provide quick response to changes in power setting, the heating element is operated at a power level higher than that corresponding to the selected power setting whenever the heater energy count is less than its minimum threshold count and at a power level less than the power level corresponding to its selected power setting whenever the heater energy count is greater than its maximum threshold count.

7 Claims, 13 Drawing Sheets

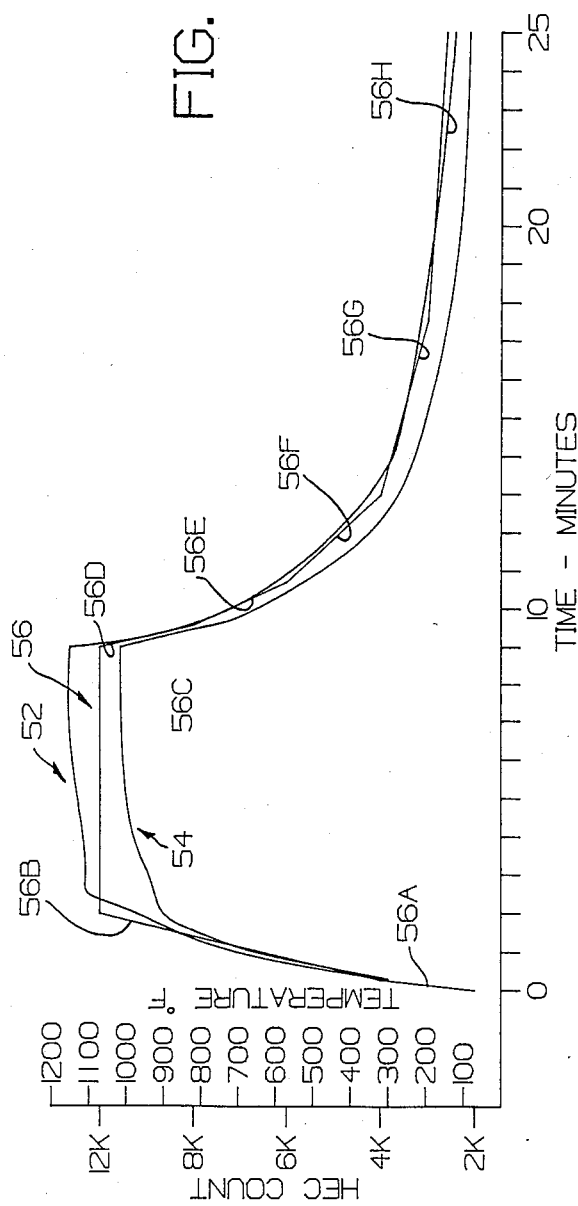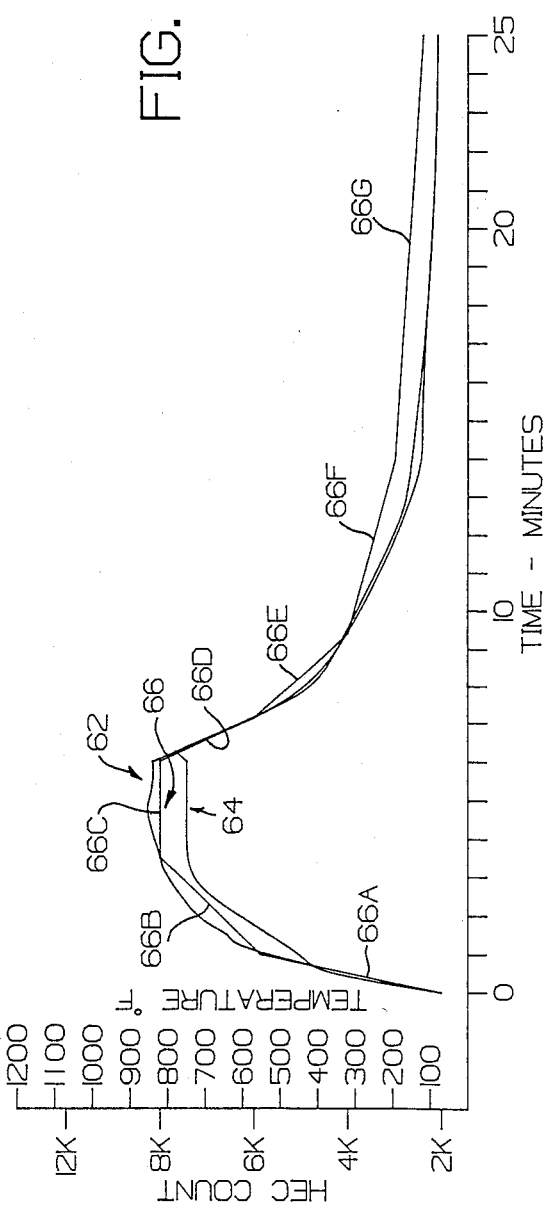

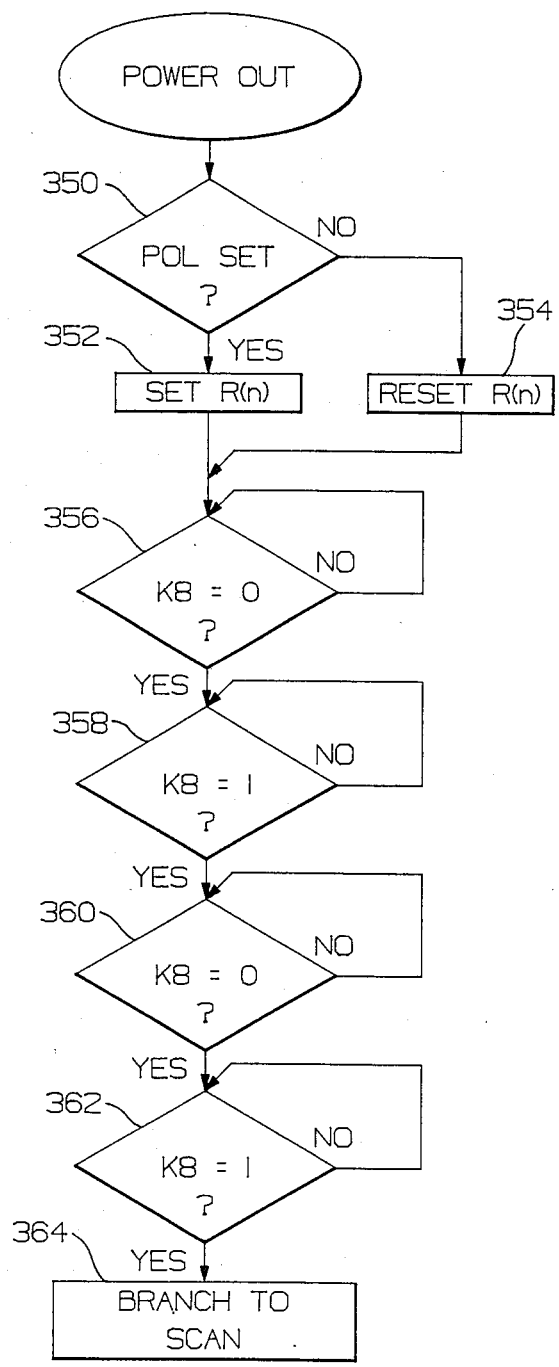

POWER CONTROL FOR COOKING APPLIANCE WITH TRANSIENT OPERATING MODES

BACKGROUND OF THE INVENTION

This invention relates generally to a power control arrangement for resistive heating elements and more particularly to a power control arrangement for resistive heating elements used as surface units in cooking appliances such as ranges. It is an improvement to the power control arrangement disclosed and claimed in commonly assigned U.S. Pat. No. 4,443,690 to Thomas R. Payne and Alfred L. Baker, which makes use of a heater energy counter which is the subject of commonly assigned U.S. Pat. No. 4,551,618 to Payne.

In the arrangement disclosed in U.S. Pat. No. 4,551,618 a software implementable heater energy counter provides approximate heating element temperature information for a resistive heating element selectively energizable at various power levels according to the user selected power setting. The heater energy counter is incremented and decremented at rates which are approximately proportional to the rates of increase or decrease respectively of the temperature of the heating element in response to changes in the power setting to higher or lower power settings respectively such that the count of the heater energy counter approximately tracks the heating element temperature. In U.S. Pat. No. 4,443,690 heater energy counter information is used to initiate transient fast heat, fast cool operating modes which reduce the time required for the heating element temperature to respond to changes in the selected power setting for the heating element.

In the fast heat and fast cool operating modes the heating element operates at a power level higher than the selected power level for a predetermined time period when a change in power setting is detected, the newly selected power setting represents an increase above a predetermined relatively low power setting, and the count of the heater energy counter is less than a predetermined minimum value. The predetermined minimum power setting and predetermined minimum heater energy count are employed to prevent overshooting the desired temperature. Similarly, the fast cool operating mode is initiated when a change to a lower power setting is detected, the newly selected power setting is less than a predetermined relatively high power setting, and the count of the heater energy count is greater than a predetermined count to prevent undershooting the desired temperature. This arrangement does significantly decrease response time over a conventional open loop arrangement under those conditions which trigger operation in the transient mode. Since once initiated, operation in either of the transient modes is for predetermined times independent of the actual operating conditions, the system is relatively imprecise. Consequently, the threshold values for power settings and the predetermined time periods must be conservatively chosen to prevent overshooting or undershooting the target temperature. As a result, the time of response is enhanced primarily in the relatively extreme operating conditions of changing from very low to very high power settings and vice versa. Therefore, there is a need for a control arrangement using the heater energy counter which provides more accurate control enabling a more rapid response to changes in power setting throughout the range of power settings.

Accordingly, it is a principal object of the present invention to provide a power control system for household cooking appliances employing resistive heating elements which is an improvement to the power control system disclosed in U.S. Pat. Nos. 4,443,690 and 4,551,618, which further reduces the time required for the heating element temperature to reach the new operating temperature in response to changes in the selected power setting for the heating element throughout the range of operating conditions.

SUMMARY OF THE INVENTION

A power control system for controlling the power output of a heating element in a cooking appliance in response to a power setting selected by the operator from a plurality of available power settings is provided.

The power control system includes power control means for operating the heating element at different power levels in response to the selection of different ones of the power settings, each setting having a corresponding steady state power level. Approximate heating element temperature information is provided by a heater energy counter. Each power setting has associated with it a corresponding predetermined steady state energy count which is approximately proportional to the steady state operating temperature of the heating element when operated at its corresponding steady state power level. The energy counter is selectively incremented at a rate approximately proportional to the rate of increase of the heating element temperature when the count of the heater energy counter is less than the steady state count for the power level then being applied to the heating element and decremented at a rate approximately proportional to the rate of decrease of the temperature of the heating element when the count is greater than the steady state count for the applied power level. In addition, at least certain ones of the power settings each have a corresponding minimum threshold count less than its steady state count and a maximum threshold count greater than its steady state count. The power control means includes means responsive to the heater energy counter, operative to operate the heating element at a power level higher than the power level corresponding to the selected power setting whenever the heater energy count is less than the minimum threshold count for the selected power setting, to operate the heating element at a power level less than the power level corresponding to the selected power setting whenever the heater energy count is greater than the maximum threshold count for the selected power setting and to operate the heating element at the power level corresponding to the selected power setting when the count of the energy counter is between the minimum and maximum threshold counts, thereby reducing the time required for the heating element to reach its steady state operating temperature in response to changes in the selected power setting. The maximum and minimum threshold counts are selected to be sufficiently close to the desired steady state count to permit fast response without overshooting the desired temperature.

While in the preferred form of the invention the heating element is overdriven when the count signifies a temperature less than the desired temperature for the selected setting and the element is underdriven when the count signifies a temperature higher than the desired target temperature, it will be appreciated that either mode of operation could be initiated independently. For example, it might be desirable to provide rapid response to increases in power setting such as when turning from OFF to a power setting or from a lower to a higher power setting without concern for the response time associated with cooling down from a higher setting to a lower power setting. Thus, in accordance with one aspect of the present invention a power control arrangement could be provided in which the power control means responds to the energy counter means to operate the heating element at a power level higher than the power level corresponding to the selected power setting whenever the energy count is less than the minimum threshold count for the selected power setting and operates the unit at the power level associated with the selected power setting otherwise. Similarly, should it be desired to provide a rapid response only to changes from higher to lower power setting, a control arrangement could be provided in accordance with the present invention which operates the heating element at a power level lower than the power level corresponding to the user selected power setting when the count of the energy counter is greater than the maximum threshold count for the selected power setting and operates the element at the power level associated with the selected power setting otherwise.

In a preferred form of the invention, the power control means operates the heating element at a power level which is a predetermined number of power levels, preferably three, higher than the selected power level or the maximum power level, whichever is lower, when the count is less than the minimum threshold count and operates the heating element at a power level which is a predetermined number of levels, also preferably three, less than the power level corresponding to the selected power setting or OFF if the selected power setting is within the predetermined number of levels of the OFF setting, when the count is greater than the maximum threshold count.

While the novel features of the invention are set forth with particularity in the appended claims, the invention both as to organization and content will be better understood and appreciated from the following detailed description taken in conjunction with the drawings.

BRIEF DESCRIPTION OF THE DRAWINGS

FIGS. 4A and 4B are graphs depicting representative temperature vs. time curves for the heating element of the type employed in the control arrangement of FIG. 2 for certain power settings and load conditions;

FIG. 11 is a flow diagram of the POWER OUT routine incorporated in the control program of the microprocessor in the circuit of FIG. 6.

DETAILED DESCRIPTION

Figure 1:
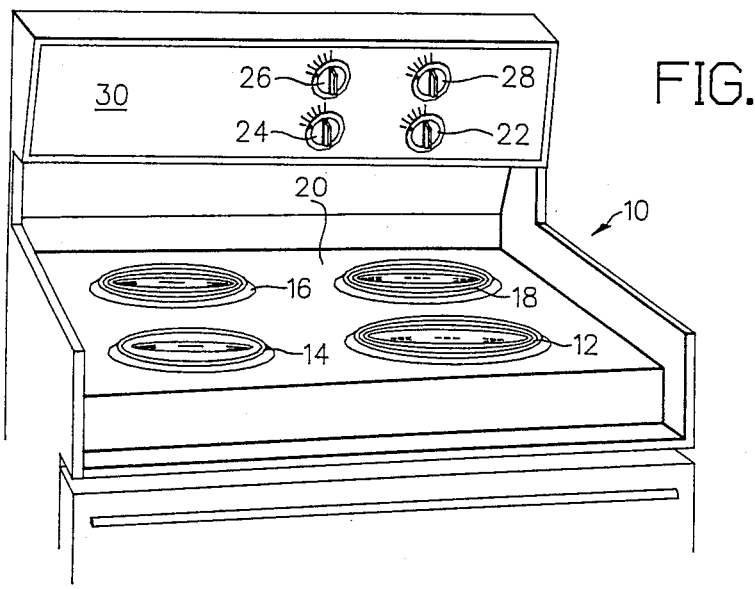
FIG. 1 is a front perspective view of a portion of an electric range embodying the control arrangement of the present invention.

FIG. 1 illustrates an electric cooking range 10 incorporating a control arrangement embodying the present invention. Range 10 includes four conventional electric surface resistance heating elements 12, 14, 16, and 18 supported from a substantially horizontal support surface 20. Manually operable rotary control knobs 22, 24, 26 and 28 mounted to control panel 30 enable the user to select the desired power level for heating elements 12, 14, 16 and 18, respectively.

Figure 2:
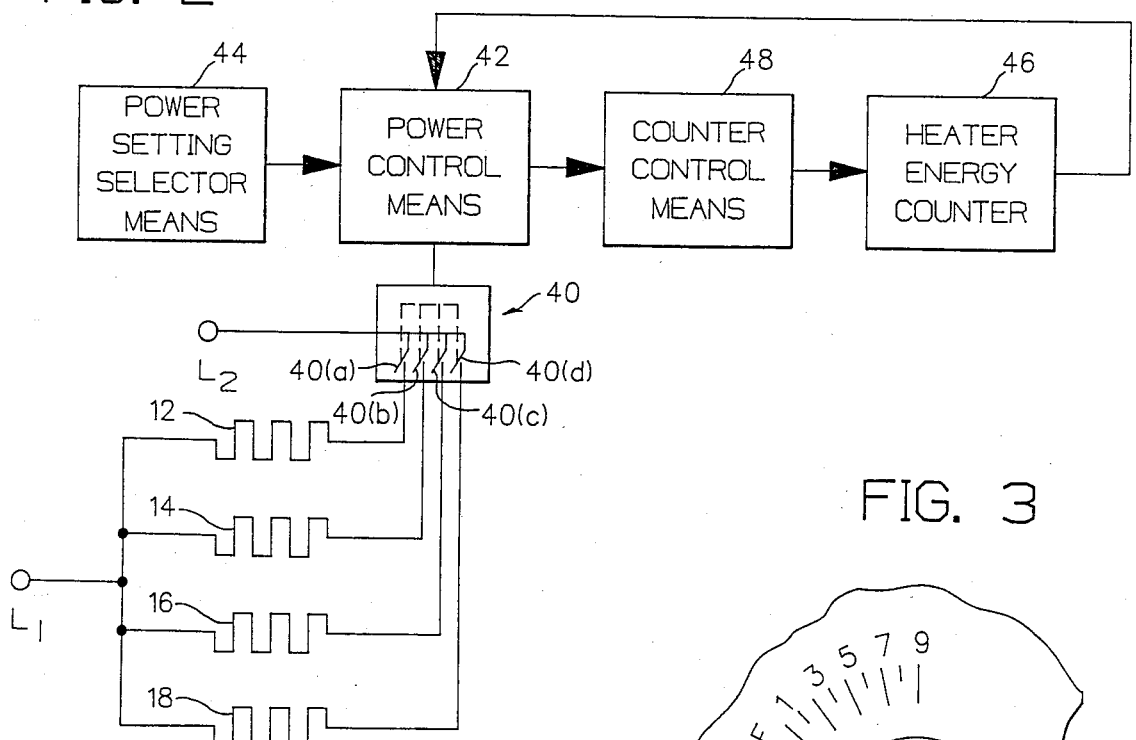
FIG. 2 is a greatly simplified functional block diagram of the control arrangement of the present invention.

As illustrated in the generalized block diagram of the control arrangement for range 10 shown in FIG. 2, the heating elements 12, 14, 16 and 18 are energized by standard 60 Hz AC power signal which can be either 120 or 240 volts supplied to terminals L1 and L2. Elements 12, 14, 16 and 18 are connected electrically in parallel across lines L1 and L2. Power to the heating elements is controlled by switch means 40 which includes separate switch means 40(a)-40(d) in series with each of the heating elements 12, 14, 16 and 18, respectively, to permit independent control of power to each of the heating elements. The switch means for each element is switched into and out of conduction in response to control signals generated by power control means 42, which are generated in accordance with the power setting selected by the operator for each heating element.

Figure 3:
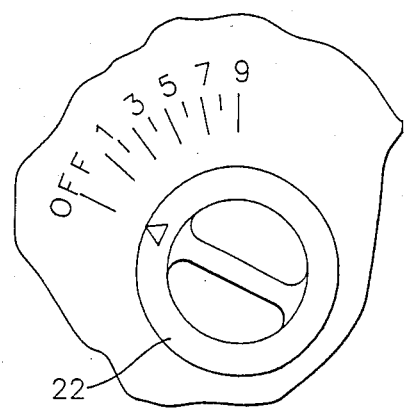
FIG. 3 is a greatly enlarged view of a portion of the control panel of the range of FIG. 1 showing the details of one of the control knobs thereof.

Power setting selection means 44 provides power level control signals to power control means 42 representing the settings selected by manual manipulation of control knobs 22 through 28 of FIG. 1. As best seen in FIG. 3, each of control knobs 22-28 enables the user to select one of 10 available discrete power settings including an OFF power setting for the corresponding heating element. Clearly, a greater or fewer number of power settings could be provided. Also, alternative means for power setting selection by the user, for example, a digital keyboard, could be employed.

In the illustrative embodiment, a predetermined control period comprising a fixed number of control intervals is employed as the time base for power control. Each control interval comprises eight cycles of the standard 60 HZ 240 volts AC power signal, corresponding to a period of approximately 133 milliseconds. Each control period comprises 128 control intervals corresponding to a period of approximately 17 seconds duration. The durations for the control interval and for the control period were selected to provide a satisfactory range of power levels for desired cooking performance, which could be implemented using relay switching devices and programmed to make efficient use of the microprocessor memory.

Each heating element is switched into conduction for a particular number of control intervals during each control period according to the desired output power, which under steady state conditions is based on the corresponding operator selected power setting. The ratio of conductive control intervals to the total control intervals in the control period, expressed as a percentage, is referred to hereinafter as the duty cycle. Table I shows the percentage ON time and the number of conductive control intervals per control period for each of the 10 power levels. The duty cycles for each of the power levels was determined empirically to provide the desired range of cooking temperatures for satisfactory cooking performance. It is understood that control intervals and control periods of greater or lesser duration as well as other duty cycles could be similarly employed.

TABLE I

| COL. 1 POWER SETTING | COL. 2 % ON TIME | COL. 3 ON CONTROL INTERVALS PER CONTROL PERIOD | COL. 4 STEADY STATE HEC COUNT | MINIMUM THRESHOLD HEC COUNT | MAXIMUM THRESHOLD HEC COUNT |
|---|---|---|---|---|---|
| OFF | 0 | 0 | — | — | — |
| 1 | 3 | 4 | 2048 | 512 | 5120 |
| 2 | 8 | 10 | 2048 | 512 | 5120 |
| 3 | 15 | 18 | 4096 | 2048 | 6144 |
| 4 | 20 | 26 | 4096 | 2048 | 6144 |
| 5 | 33 | 42 | 4096 | 2048 | 6144 |
| 6 | 41 | 53 | 6144 | 4096 | 7168 |
| 7 | 50 | 64 | 6144 | 4096 | 7168 |
| 8 | 72 | 96 | 8192 | 5120 | — |
| 9 | 100 | 128 | 8192 | 5120 | — |

A heater energy counter 46 is provided for each heating element to provide approximate heating element temperature information in lieu of a temperature sensor. Each power setting has a corresponding predetermined empirically established steady state heater energy count. This steady state count is approximately proportional to the steady state temperature of the heating element when operating under steady state condition at the corresponding power level for that power setting.

Counter control means 48 responds to power control means 42 to selectively increment energy counter means 46 at increment rates which are approximately proportional to the rate of increase of the heating element temperature when the count of the energy counter is less than the steady state count for the selected power setting, signifying that the heating element has not yet reached the steady state temperature for the selected setting. Similarly, the heater energy counter is decremented at a rate which is approximately proportional to the rate of decrease of the heating element temperature, when the count of the heater energy counter is less than the steady state count for the selected power setting, signifying that the heating element is at a temperature higher than the desired temperature for the selected power setting. By incrementing and decrementing heater energy counter 46 in this manner, the count of the heater energy counter means 46 is approximately proportional to the temperature of the heating element, thereby providing an approximate measure of heating element temperature.

It will be recalled that a object of the control arrangement of the present invention is to provide an improved power control arrangement which uses the heater energy counter information to provide a more accurate and rapid response to changes in power setting than that for the control arrangement disclosed in U.S. Pat. No. 4,443,690. To this end, in accordance with the present invention, each power setting also has associated with it a corresponding minimum threshold count less than its steady state count and a predetermined maximum threshold count greater than the steady state count. Power control means 42 is responsive to energy counter means 46, to operate heating element at a power level higher than the power level associated with the selected power setting whenever the count is less than the minimum threshold count for the selected power setting, and to operate the heating element at a power level lower than the power level associated with the selected power setting whenever the heater energy count is greater than the maximum threshold count for the selected power setting thereby reducing the time required for the heating element to reach its steady state operating temperature in response to changes in the selected power setting. The predetermined steady state and maximum and minimum threshold counts for each power level are also shown in Table I.

These maximum and minimum threshold counts have been empirically chosen to provide the acceptable response times for changes in power setting for the circuit of the illustrative embodiment without over or undershooting the target temperature. For power settings 1-2 the minimum threshold count of 512 ($\frac{1}{2}$K) corresponds to a temperature of approximately 150° F. and the maximum count of 5120 corresponds to a temperature of approximately 700° F.; for power settings 3-5 the minimum count of 2K corresponds to approximately 320° F. and the maximum count of 6K corresponds to approximately 820° F.; for settings 6-7, the minimum count of 4K and the maximum of 7K corresponds to a temperature range of 570° F.–950° F.; and for settings 8-9, the minimum count of 5K corresponds to a temperature of approximately 700° F. In the illustrative embodiment the heating element can be overdriven at up to three power levels higher than the level associated with the selected setting without substantial overshoot when the temperature as represented by the count is less than the minimum reference temperature. Similarly, underdriving the element by three power levels will not result in significant undershoot when the temperature of the element as indicated by the count is greater than the maximum threshold temperature.

It will be appreciated that the accuracy of the system could be further refined by providing thresholds for each individual power setting at the expense of additional microprocessor memory.

As described in the aforementioned U.S. Pat. No. 4,443,690, the use of a counter to approximately track heating element temperature is premised in the notion that the temperature of a heating element reflects the net energy balance of the heating element. When power is initially applied to the heating element at room temperature energy is being added to the heating element from the power supply at a rate greater than the heating element dissipates the energy through radiation and conduction by heat transfer to the surroundings resulting in a net increase in the energy level for the element. This net increase in energy level results in an increase in the temperature of the heating element. Eventually, the heating element reaches a temperature at which it is dissipating energy at a rate equal to the energy being provided from the power supply, at which time the temperature levels off, and the system operates in its steady state phase or mode. When the heating element is deenergized, the heating element dissipates energy resulting in a temperature decrease until the heating element temperature returns to room temperature.

By incrementing and decrementing a counter at rates which approximate the rates at which the net energy balance of the heating element increases or decreases, the count of the energy counter at any point in time is approximately proportional to the net energy level characterized by a particular temperature. Thus, it is possible to empirically determine counter increment rates for each power level which are approximately proportional to the rate of temperature increase or energy increase for the heating element for that particular power level; and counter decrement rates for each power level which are approximately proportional to the rate of temperature decrease of energy decrease for the heating element when the element is cooling down to the steady state temperature for the applied power level. By incrementing or decrementing the counter at the appropriate rate for the applied power level, the count of the counter is approximately proportional to the temperature of the heating element.

As illustrated by the temperature versus time curves in FIGS. 4A and 4B, the temperature response of resistive heating elements of the type normally used for cooking apparatus when energized at room temperature generally can be characterized by heating curves comprising a heat-up phase and a steady state phase; and when power is removed, the temperature response can be characterized by a cooling-down phase. The curves for a typical heating element used as a surface unit in an electric range shown in FIGS. 4A and 4B represent full power and half power operation respectively. The heating element is at room temperature when it is first energized and the appropriate power level is applied until the steady state temperature is reached. The heating element operates at this steady state level until power is removed, at which time the heating element cools down to room temperature.

Curves 52 and 54 in FIG. 4A represent thermal curves for the heating element operating at 100% power with no utensil on the surface unit and with a utensil containing 2 liters of water, respectively.

Curve 56 represents a linearized approximation of the curve for the 100% power level. The slope of curve portion 56A represents a counter increment rate of 1920 counts per control period which is that implemented in the illustrative embodiment for the counter when power level 9 is selected and the count is less than 2K. Portion 56B represents an increment rate of 1024 counts per control period which is implemented when the count is greater than 2K and less than 8K (see Table II). The horizontal portion 56C of the curve represents the steady state count of the counter for the power level selected, which in the illustrative embodiment is set at 8192 for power level 9. The slopes of portions 56D, E, F, G and H represents the rates for decrementing counter 46 when the element is turned off, when the count is between 6K and 8K, 4K and 6K, 2K and 4K, 1K and 2K, and 0–1K respectively, which in the illustrative embodiment are 1024, 512, 256, 64 and 16 counts per control period respectively.

Curves 62 and 64 represent analogous temperature versus time curves for No Load and a 2 liter water load for heating element 12 operating at ½ power or 50% duty cycle. Curve 66 represents the linearized approximation of the 50% power curve. Portion 66A of curve 66 represents an increment rate of 960 counts per control period. Portion 66B represents an increment rate of 256 counts per control period. The horizontal portion 66C represents a count of 6144 (6K) which is the steady state count for power levels 6 and 7. The slopes of portions 66D–66H represent the decrement rates implemented when the element is turned OFF, which are the same as for the comparable portions of curve 56 hereinbefore described.

As suggested by the curves in FIGS. 4A and 4B, to a first degree of approximation for most conventional utensils, the slopes of the heating curves are independent of load conditions.

The increment and decrement rates associated with each power level are shown in Table II expressed in total counts per control period. These rates are also illustrated graphically in FIG. 5. These rates have been empirically chosen to provide a piece wise linear approximation of the temperature versus time curve for the heating element of the illustrative embodiment for each of the available power levels.

It is to be understood that the particular rates selected depend upon the characteristics of the heating element itself as well as the duty cycle at which it is operating. Thus, rates should be empirically determined for the particular system in which the counter arrangement is to be used.

TABLE II

| Power Level | HEC Increment Rates (Counts/Control Period) | | | | | HEC Decrement Rates (Counts/Control Period) | | | | |
|---|---|---|---|---|---|---|---|---|---|---|
| | 0–K | 1K–2K | 2K–4K | 4K–6K | 6K–8K | 8K–6K | 6K–4K | 4K–2K | 2K–1K | 1K–0 |
| OFF | — | — | — | — | — | 1024 | 512 | 256 | 64 | 16 |
| 1 | 128 | 32 | — | — | — | 384 | 192 | 64 | — | — |
| 2 | 320 | 80 | — | — | — | 960 | 480 | 160 | — | — |
| 3 | 576 | 576 | 144 | — | — | 288 | 144 | — | — | — |
| 4 | 832 | 832 | 208 | — | — | 416 | 208 | — | — | — |
| 5 | 1344 | 1344 | 336 | — | — | 672 | 336 | — | — | — |
| 6 | 848 | 848 | 848 | 212 | — | 424 | — | — | — | — |

TABLE II-continued

| Power Level | HEC Increment Rates (Counts/Control Period) | | | | | HEC Decrement Rates (Counts/Control Period) | | | | |
| --- | --- | --- | --- | --- | --- | --- | --- | --- | --- | --- |
| | 0–K | 1K–2K | 2K–4K | 4K–6K | 6K–8K | 8K–6K | 6K–4K | 4K–2K | 2K–1K | 1K–0 |
| 7 | 1024 | 1024 | 1024 | 256 | — | 512 | — | — | — | — |
| 8 | 1536 | 1536 | 768 | 768 | 768 | — | — | — | — | — |
| 9 | 2048 | 2048 | 1024 | 1024 | 1024 | — | — | — | — | — |

Various approximating techniques could be employed to arrive at the desired increment rate for each power setting, depending upon the degree of accuracy desired. The linear approximations provided by the increment and decrement rates per control period in Table II have been found to provide satisfactory results for the functions performed by the control arrangement of the present invention. It will be observed in the graph of FIG. 5 that there are certain overlaps. This results from a compromise between approximation accuracy and implementation economy. If greater accuracy is desired, rates which are more precisely tailored to each power setting could be empirically determined and readily implemented at the cost of a substantial increase in required microprocessor memory storage capacity.

Figure 5:
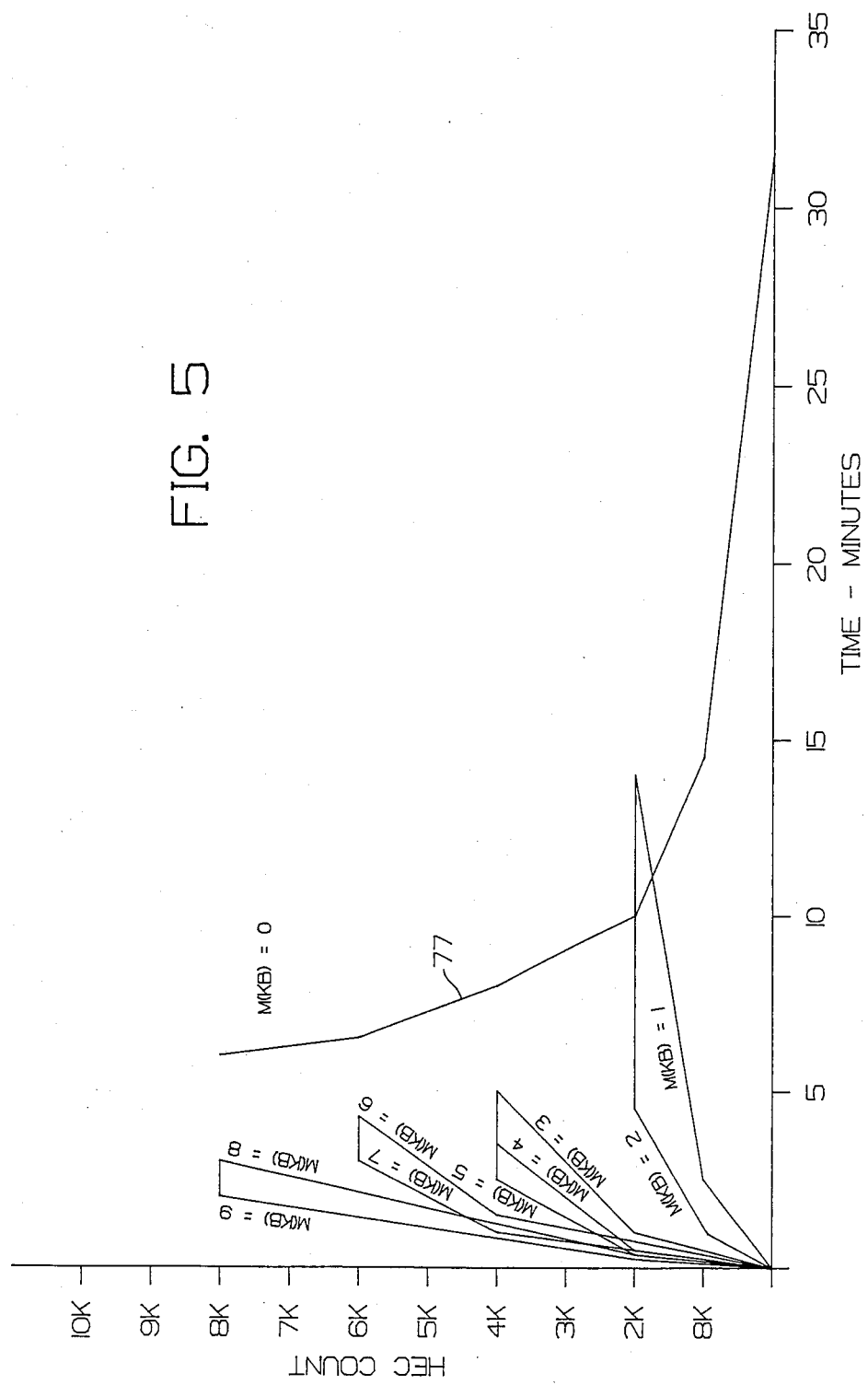
FIG. 5 is a graph depicting the count versus time curves for the various power settings for the heater energy counter in the control arrangement of FIG. 2.

In the illustrative embodiment the decrement rate illustrated by curve 77 in FIG. 5 is employed when the OFF setting is selected. However, when the element is cooling down as a result of a change from a higher power setting to a lower power setting, the element is still being energized. Thus, it cools down much more slowly. This effect is taken into account in the illustrative embodiment by empirically selecting decrement rates for each power setting which are approximately proportional to the rate of change of temperature of the heating element when cooling down to the steady state temperature associated with the selected power level from that associated with a higher previously selected setting.

As shown in FIG. 5 and also in Table I, the steady state counts are provided for groups of power settings to economize on memory storage capacity for the control. More specifically, a first group comprising settings 1 and 2 has a steady state count of 2048 (2K); a second group comprising settings 3–5 has a steady state count of 4096 (4K); a third group comprising settings 6–7 has a steady state count of 6144 (6K); and a fourth group comprising settings 8–9 has a steady state count of 8192 (8K). It has been empirically determined that these groupings and counts provide satisfactory approximations of the maximum temperature of the heating element for each of the settings. Obviously, a more accurate approximation would result if a different steady state count were used for each individual power setting.

One technique for implementing the count of the heater energy counter to approximate the temperature of a heating element when using duty cycle power control is to increment the counter at a certain rate during each control interval when the heating element is energized and decrement the counter during control intervals when it is deenergized so that during any one control period the counter would be incremented during a certain number of the control intervals and decremented during others, the net result at the end of the control period being a net increase or decrease of the count relative to the beginning of the control interval. In the illustrative embodiment an increment rate is selected which provides the desired net increase in the count at the end of each control period representing the approximate increase in temperature of the heating element during that control period for the duty cycle at which the element is operating. This is carried out by incrementing at predetermined rates during energized control intervals and holding the count constant during non-energized control intervals.

Figure 6:
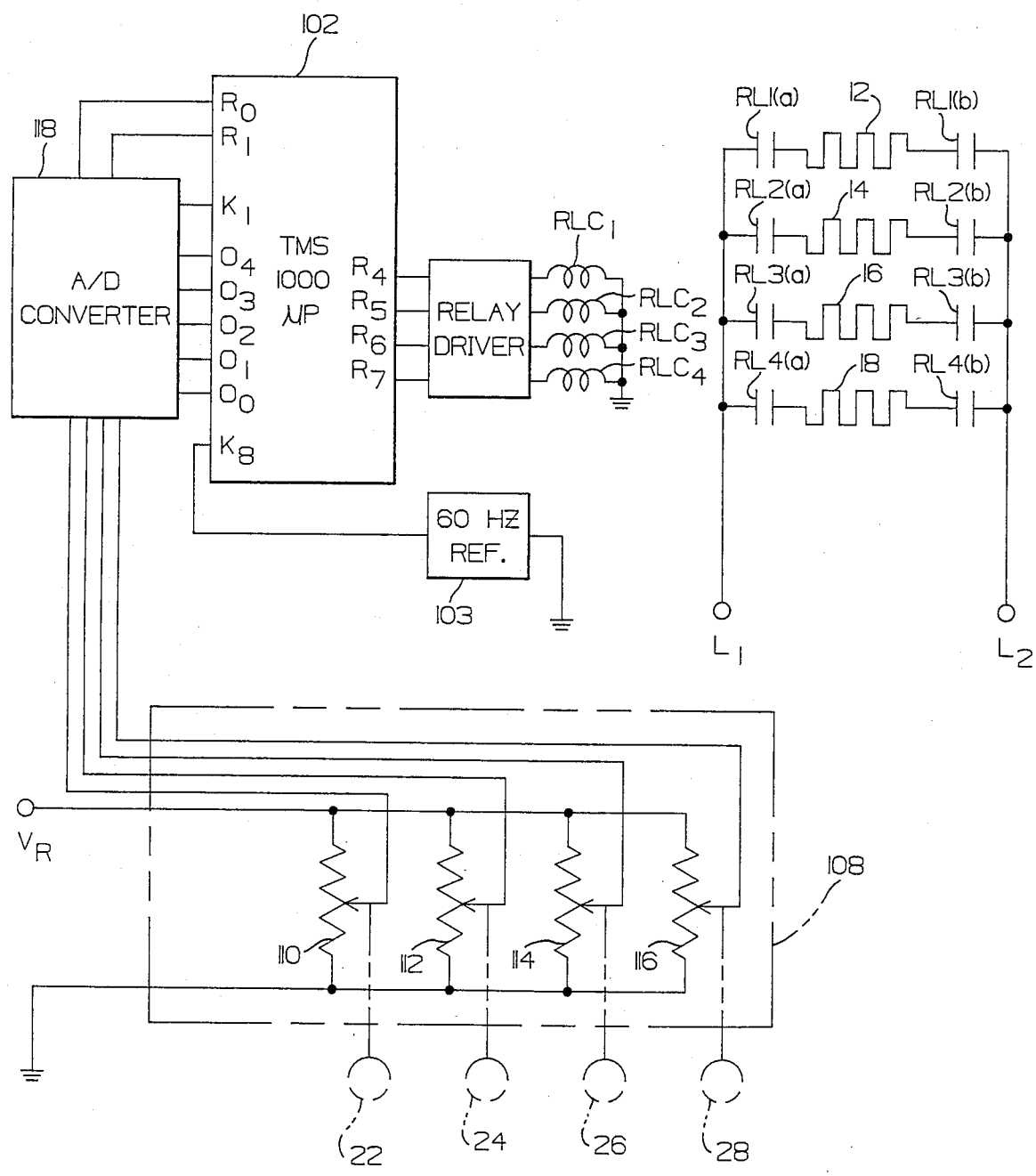
FIG. 6 is a simplified schematic diagram of a control circuit illustratively embodying the control arrangement of the present invention.

Referring now to FIG. 6, there is shown in simplified schematic form a microprocessor based control circuit which illustratively embodies the control arrangement of the present invention. Power to heating elements 12, 14, 16 and 18 is provided by application of a standard 60 Hz AC power signal of 240 volts across terminals L1 and L2. Of course, a 120 volt signal could be similarly employed. Heating elements 12, 14, 16 and 18 are arranged in an electrical parallel fashion across lines L1 and L2 via an array of relays RL1, RL2, RL3 and RL4, each having two sets of contacts (a) and (b) connected between the heating element and lines L1 and L2, respectively, for elements 12, 14, 16 and 18, respectively.

Control signals for opening and closing relays RL1–RL4 are provided by microprocessor 102, which in the illustrative embodiment is a Texas Instruments TMS 1000 series microprocessor. A 60 Hz signal is generated by a conventional zero crossing detector 103 and applied to microprocessor input port K8 for purposes of synchronizing system operation with zero crossings of the power signal applied across terminals L1 and L2. Relay control signals from output ports R4–R7 are coupled to relay coils RLC1 through RLC4 of relays RL1–RL4, respectively, by relay driver network 104. These control signals are generated by microprocessor 102 in accordance with the power level selected by the user in a manner to be described hereinafter.

Means for enabling the operator to select the desired power level for each of the heating elements 12, 14, 16 and 18 is provided by power level selection means designated generally 108. Power level selection switch means 108 comprises a set of four potentiometers 110–116 connected in parallel, for controlling of heating elements 12, 14, 16 and 18, respectively. A constant reference voltage is applied across the potentiometers 110–116. Wiper arms 110(a), 112(a), 114(a) and 116(a) for potentiometers 110–116, respectively, are positioned in accordance with the power settings selected by operator manipulation of the corresponding ones of control knobs 22–28. Conventional analog to digital converter means 118 scans the setting from each of potentiometers 110–116 to provide a digital input signal to microprocessor 102 representing the power level selected for each heating element. Scanning signals are output from microprocessor 102 at output ports $0_0$ through $0_4$. The power level signal is input to microprocessor 102 at input port K1.

Control Program

Microprocessor 102 is customized to perform the control functions of this invention by permanently configuring the ROM of the microprocessor to implement predetermined control instructions. FIGS. 7-11 are flow diagrams which illustrate the control routines incorporated in the control program of microprocessor 102 to perform the control functions in accordance with the present invention. From these diagrams, one of ordinary skill in the programming art can prepare a set of instructions for permanent storage in the ROM of microprocessor 102. For the sake of simplicity and brevity, the control routines to follow will be described with respect to the control of heating element 12. It should be understood that for the control system of FIG. 1 the routines are executed once for each of heating elements 12-18 during each control interval. It should be further understood that in addition to the control functions of the present control arrangement there may be other control functions to be performed in conjunction with other operating characteristics of the appliance. Instructions for carrying out the routines described in the diagrams may be interleaved with instructions and routines for other control functions which are not part of the present invention.

The control program consists of a sequence of routines illustrated in the flow diagrams. The control program is cycled through once each control interval for each heating element. It should be noted that the control circuit is continually energized while the apparatus is plugged in regardless of the power setting selected. A description of each routine with reference to the flow diagram follows.

Figure 7:
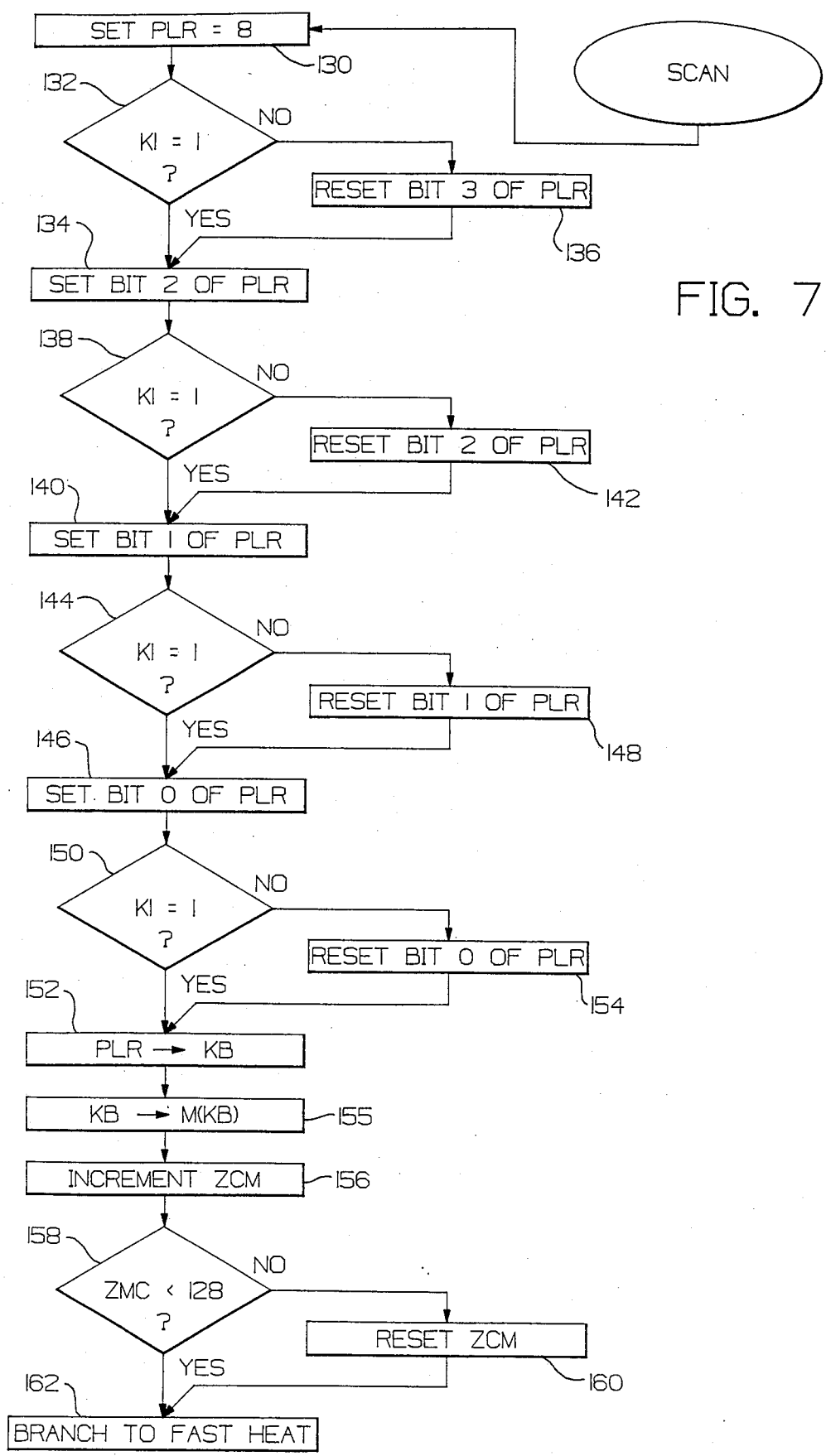
FIG. 7 is a flow diagram of the SCAN routine incorporated in the control program for the microprocessor in the circuit of FIG. 6.

(a) SCAN ROUTINE—FIG. 7

The function of this routine is to scan the operator controlled input potentiometers to determine the power setting selected for each of the heating elements. During execution of this routine for a particular heating element, the potentiometer associated with that heating element is scanned.

It will be recalled that there are 10 possible power settings represented by digital signals corresponding to the number of the settings from 0-9. In this routine, PLR is a 4-bit digital word which sets the reference voltage in the A/D conversion scheme via a resistive ladder network portion of A/D converter 118. PLR is varied in accordance with a successive approximation technique and the voltage generated in the A/D converter is then compared to the voltage across the corresponding one of operator adjustable potentiometers 110-116 to determine the power level selected.

The search starts with PLR equal to 8 (PLR→1000) (Block 130). Inquiry 132 determines if the operator selected power setting is higher (K1=1) or lower (K1=0). If higher, PLR is set equal to 12 by setting Bit 2 (PLR→1100) (Block 134). If lower, PLR is set equal to 4 by resetting Bit 3 (Block 136) and setting Bit 2 (Block 134) (PLR→0100).

Inquiry 138 determines if the setting is higher or lower than the then present PLR. If higher (K1=1) the PLR is increased by 2 by setting Bit 1 (Block 140). If lower (K1=0) PLR is decreased by 2 by resetting Bit 2 (Block 142) and setting Bit 1.

Inquiry 144 determines whether the present value of PLR is higher or lower than the reference. If higher, PLR is increased by 1 by setting Bit 0 (Block 146). If lower, PLR is decreased by 1 by resetting Bit 1 (Block 148).

Inquiry 150 repeats the higher or lower test on the selected value. If higher, the variable KB representing the selected power setting is assigned the value PLR (Block 152). If lower, PLR is reduced by 1 by resetting Bit 0 (Block 154) and then KB is assigned the value PLR (Block 152). The variable M(KB) representing the actual power level to be applied, is assigned the value KB (Block 155). M(KB) is used in the Power Compare routine (FIGS. 9A and 9B) to determine the power level applied to the heating element. Under steady state operating conditions M(KB) is the same as KB. However, in the transient Fast Heat and Fast Cool modes M(KB) may differ from KB, as will be described with reference to FIGS. 8A and 8B.

The Master Counter (ZCM) is incremented (Block 156). The ZCM count is checked by Inquiry 158. If greater than 128, ZCM is reset (Block 160). The program then branches (BLock 162) to the Input Test Routine, FIG. 9.

Figure 8A:
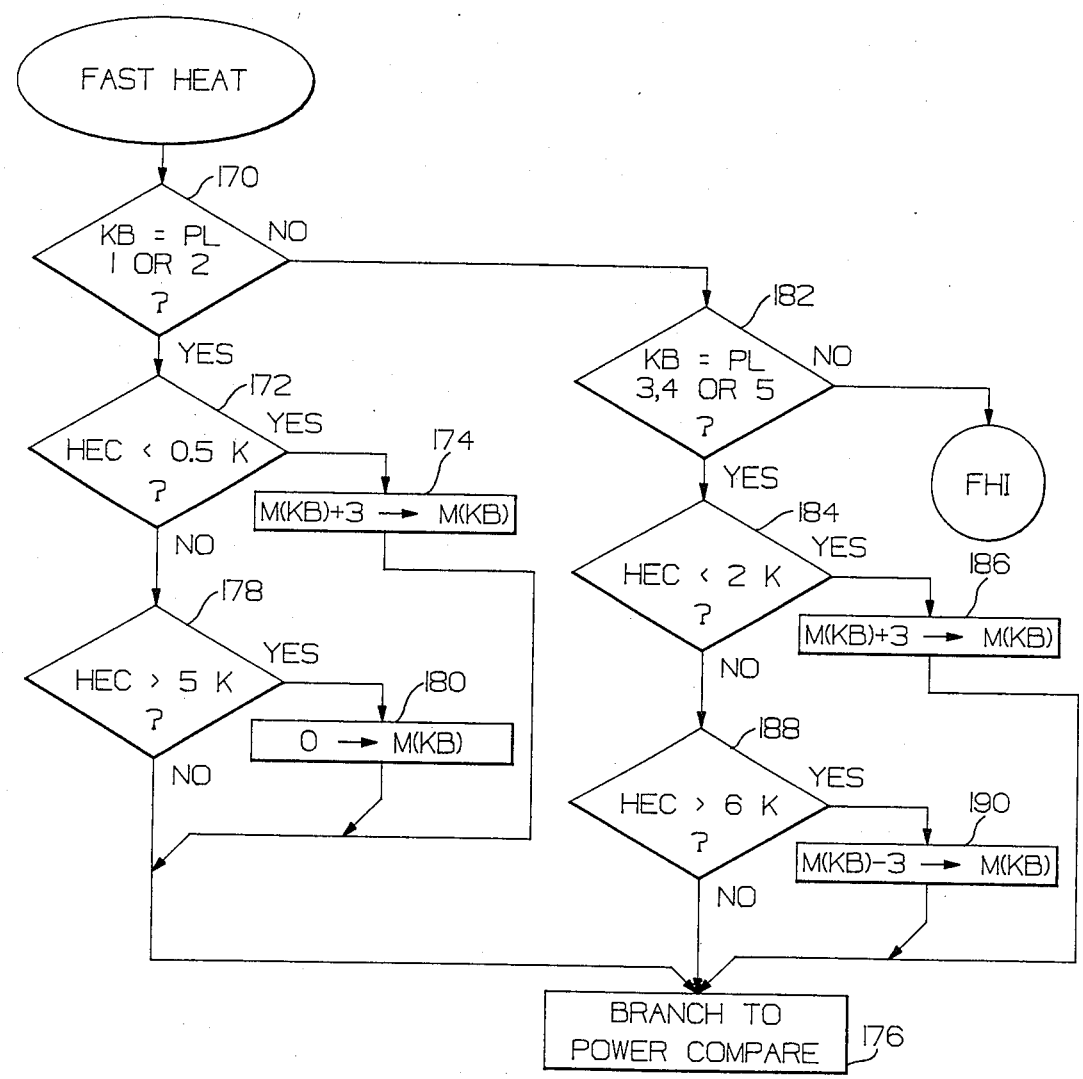
FIGS. 8A and 8B are flow diagrams of the FAST HEAT/FAST COOL routine incorporated in the control program for the microprocessor in the circuit of FIG. 6.
Figure 8B:
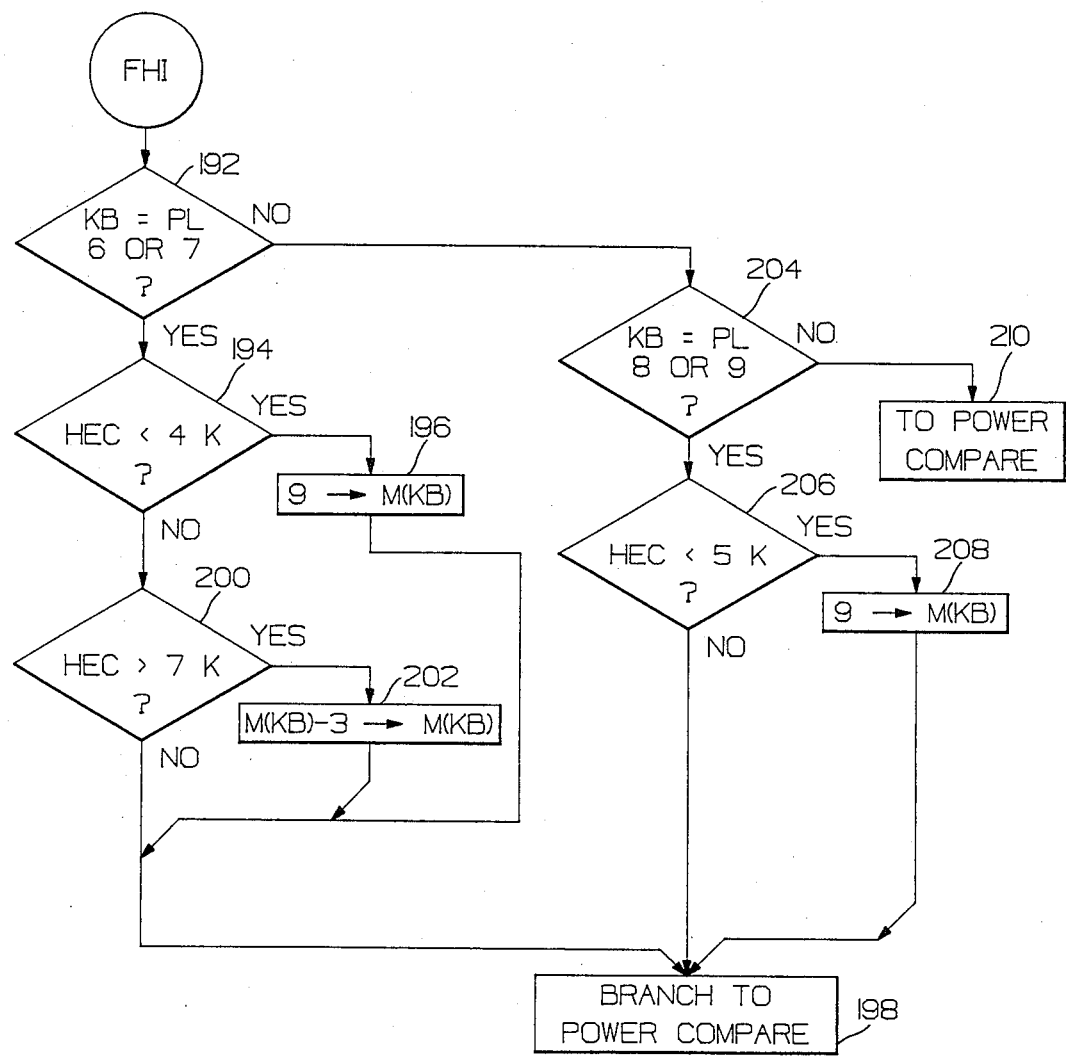

(b) FAST-HEAT/FAST-COOL ROUTINE—FIGS. 8A and 8B

This routine is responsive to the count of the heater energy counter and its function is to substitute a power level higher than or lower than the steady state power level associated with the selected power setting when the count of the heater energy counter signifies that operation in the Fast Heat or Fast Cool modes respectively is in order. In this routine the count of the heater energy counter is compared to the minimum and maximum threshold counts for the selected power setting to determine if operation in the Fast Heat or Fast Cool mode is called for. When the count of the heater energy counter is less than the minimum threshold count for the selected power setting, the power level will be adjusted upward by three power levels or to the maximum power level if the selected level is within three levels of the maximum power level. Similarly, if the count is greater than the maximum count for the selected power setting, the power level to be applied will be lowered by three power levels or to the lowest power setting, namely OFF, if the selected power setting is within three levels of OFF.

Figure 9A:
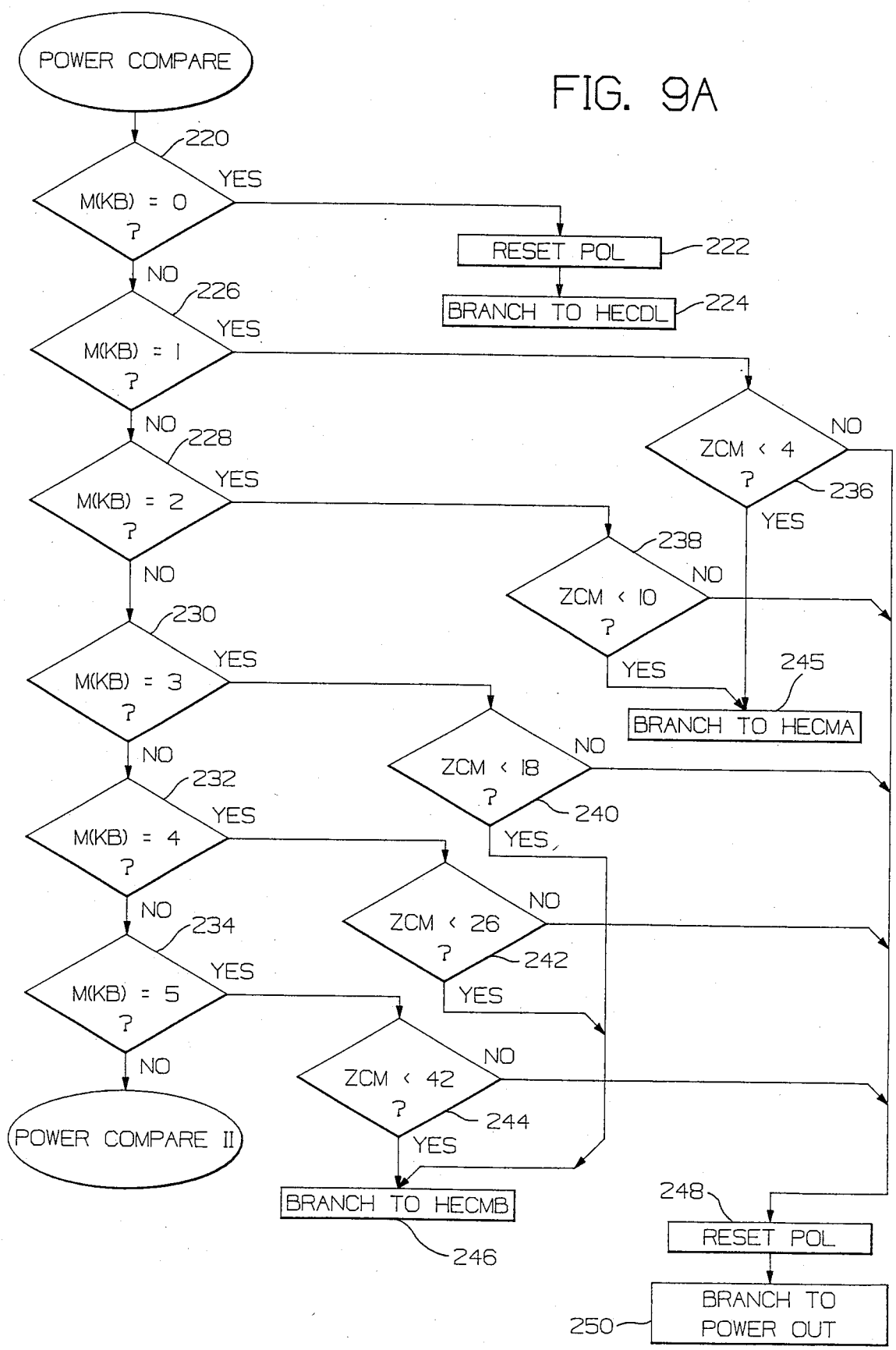
FIGS. 9A and 9B are flow diagrams of the POWER COMPARE routine incorporated in the control program of the microprocessor in the circuit of FIG. 6.

Referring now to the flow diagram of FIG. 8A, if one of the power settings 1 or 2 is selected as determined by Inquiry 170, Inquiry 172 checks to see if the count is less than the minimum threshold count for these power settings, $\frac{1}{2}$K. If so, variable M(KB) representing the power level to be applied to the heating element is incremented by 3 (Block 174) and the program branches (Block 176) to the Power Compare routine (FIG. 9A). If the count is not less than $\frac{1}{2}$K, Inquiry 178 determines if the count is greater than the maximum threshold count for settings 1 and 2 of 5K. If so, M(KB) is set to 0 representing the OFF setting (Block 180) and program branches (Block 176) to Power Compare routine.

Similarly, if one of power settings 3, 4 or 5 is selected as determined by Inquiry 182, Inquiry 184 determines if the count is less than the minimum threshold count for these power settings of 2K. If so, M(KB) is increased by 3 (Block 186) and the program branches (Block 176) to the Power Compare routine. If the count is not less than 2K, Inquiry 188 determines if the count is greater than 6K, the maximum threshold count for these power settings. If so, the power setting is reduced by three (Block 190) and the program branches (Block 176) to the Power Compare routine.

Referring now to the flow diagram of 7B, if one of power settings 6 and 7 is selected, as determined by Inquiry 192, Inquiry 194 determines if the HEC count is less than the minimum threshold count of 4K. If so, the applied power level M(KB) is increased to power setting 9 (Block 196) and the program branches (Block 198) to the Power Compare routine. If the count is not less than 4K, Inquiry 200 determines if the count is greater than the maximum threshold count of 7K. If so, the power setting is reduced by 3 (Block 202) and the program branches (Block 198) to the Power Compare routine.

If one of power levels 8 and 9 are selected as determined by Inquiry 204, Inquiry 206 determines if the count of the heater energy counter is less than the minimum threshold count of 5K for these power settings. If so, M(KB) is set equal to 9, the maximum power setting. If not, the program simply branches (Block 198) to the Power Compare routine. If the selected power setting KB is not one of settings 1-9 (a No at Inquiry 204), the unit is operating in the OFF mode (KB=0) and the program merely branches (Block 210) to the Power Compare routine of FIG. 9A.

Figure 9B:
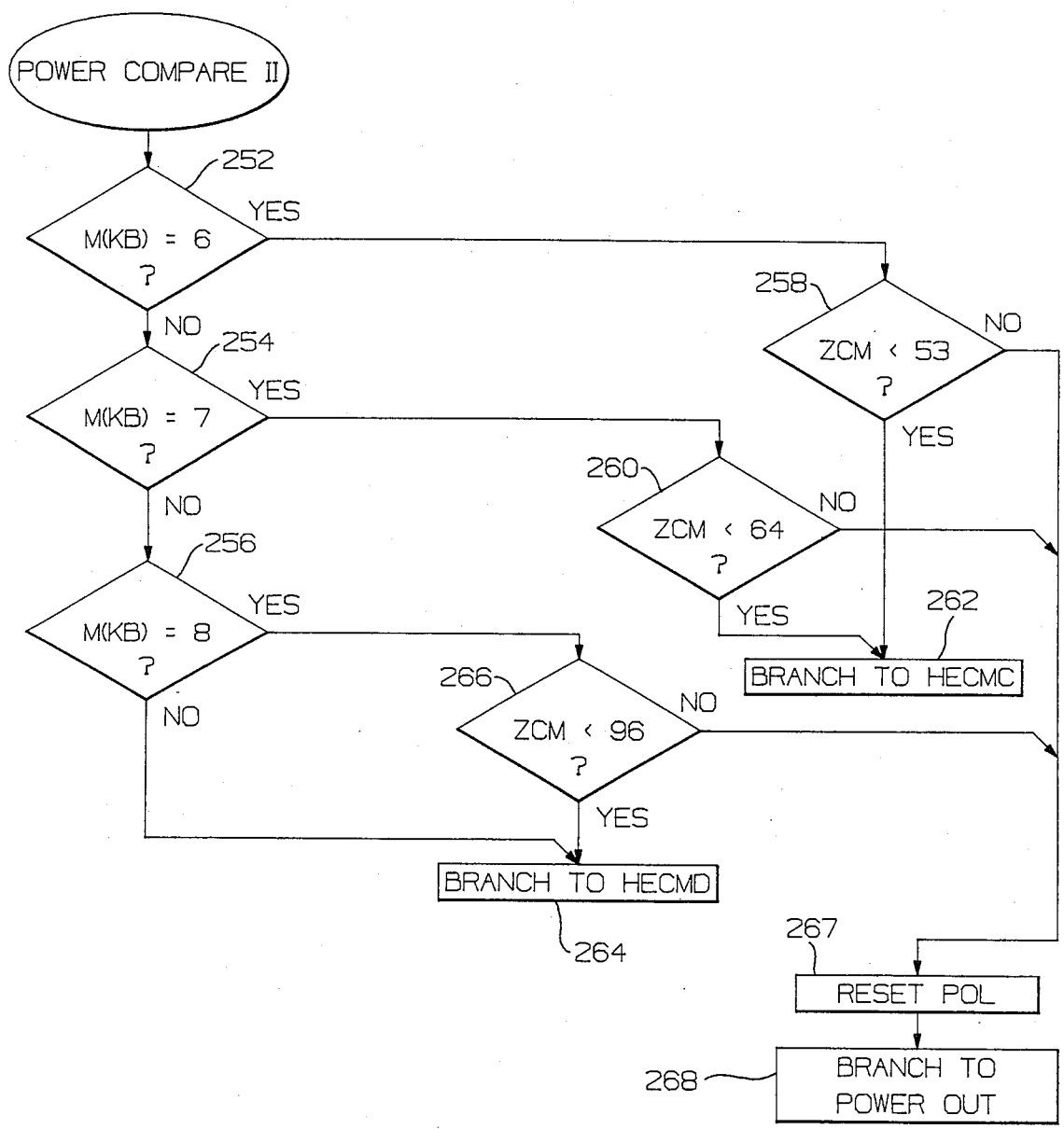

(c) POWER COMPARE ROUTINE—FIGS. 9A-9C

This routine determines during each control interval whether or not the heating element is to be energized for the next control interval. This is done by comparing the count of the Master Counter (ZCM) to a number corresponding to the number of control intervals for which the heating element is energized per control period to implement the duty cycle for the power level to be applied.

For M(KB)=0 representing the OFF power setting, Inquiry 220 and Block 224 direct the program to the Counter Decrementing Routine HECDL (FIG. 9C) after resetting the Power Out Latch (POL) (Block 222) utilized in the Power Out routine (FIG. 11). For M(KB) representing power level settings 1-5 (Inquiries 226-234) the ZCM count is compared to reference counts 4, 10, 18, 26 and 42 respectively (Inquiries 236-244). If the power level to be applied is one of levels 1-2 and the ZCM count is less than the reference corresponding to that power level, the heating element will be energized during the ensuing control interval and the program branches (Block 245) to the Heater Energy Counter Routine, entry point HECMA (FIG. 10A), to increment the Energy Counter of the appropriate rate for the applicable power level. For power levels 3-5, when the ZCM count is less than the corresponding reference, the program branches (Block 246) to entry point HECMB of the Heater Energy Counter routine to increment the Heater Energy Counter at the appropriate rate for the applicable power level. If the ZCM count is not less than the corresponding reference value for the applicable power level, POL is reset (Block 248) and the program branches (Block 250) to the Power Out routine. If the applicable power level is not one of levels 1-5, the program continues at Compare II (FIG. 9B).

Referring now to FIG. 9B, Inquiries 252, 254, and 256 determine whether the applicable power level is level 6, 7 or 8, respectively. The corresponding reference values for these power levels are 53, 72 and 96, respectively. If the applicable power level is 6 or 7 and the ZCM count is less than the corresponding reference value as determined by Inquiries 258-260, respectively, the heating element will be energized during the ensuing control interval, and the program branches (Block 262) to the Heater Energy Compare routine, entry point HECMC (FIG. 10A) to increment the Heater Energy Counter at the appropriate rate. For power level 8, Inquiry 266 compares the ZCM count to the reference count at 96 for power level 8. If the count is less than the reference value, the heating element will be energized during the ensuing control interval and the program branches (Block 264) to entry point HECMD of the Heater Energy Counter routine. If one of these power levels 6-8 is to be applied but the count is greater than the corresponding reference value, the heating element will not be energized during the ensuing control interval. POL is reset (Block 266) and the program branches (Block 268) to the Power Out routine (FIG. 11).

Additionally, if the answer to Inquiry 340 is no, the selection must represent power level 9, which is the maximum power level. For power level 9 the heating element is energized during every control interval. When applying power level 9 to the heating element the program branches (Block 264) to Heater Energy Compare routine at entry point HECMD (FIG. 11).

Figure 10A:
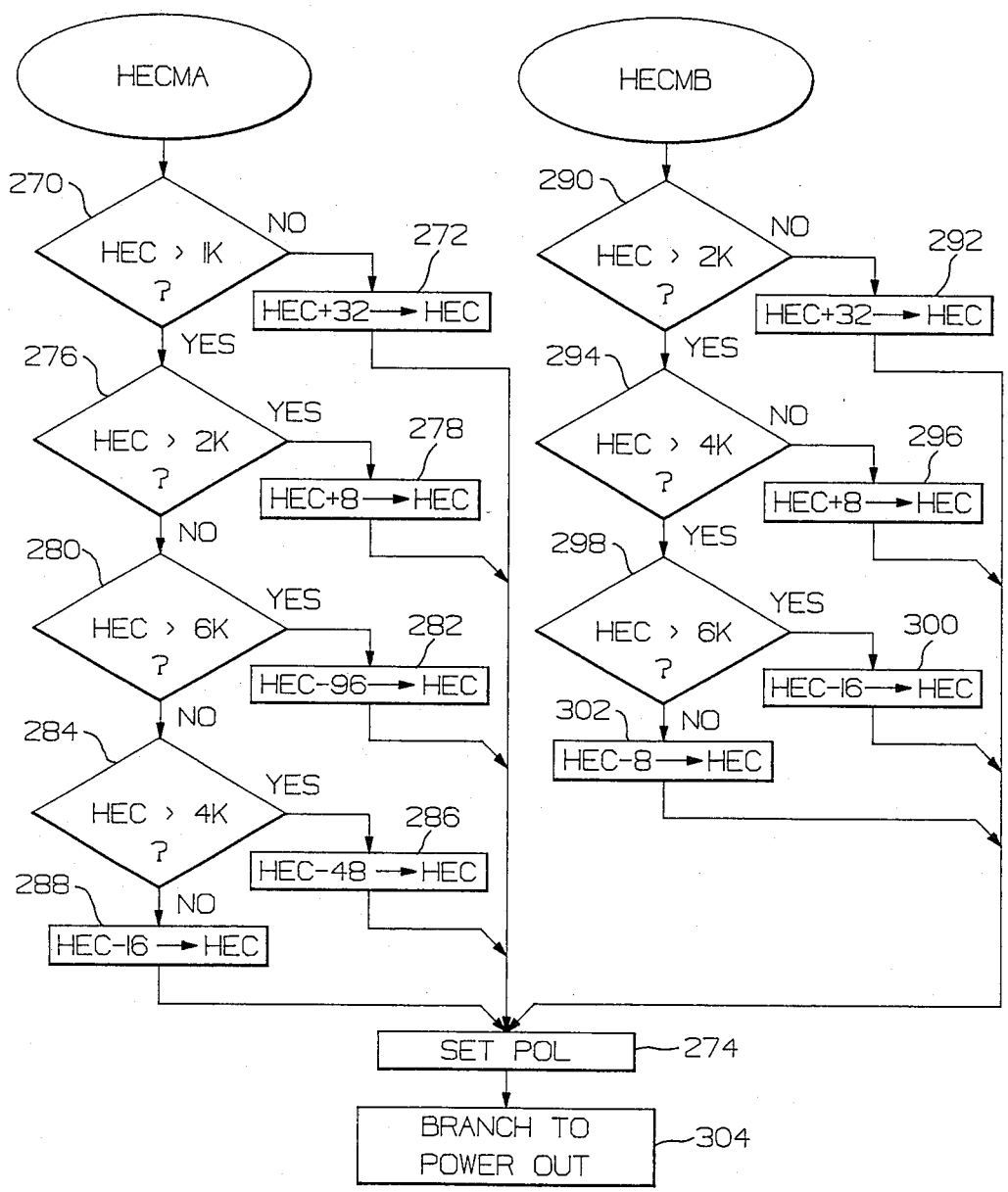
FIGS. 10A, 10B and 10C are flow diagrams of the HEATER ENERGY COMPARE routine incorporated in the control program of the microprocessor in the circuit of FIG. 6.
Figure 10B:
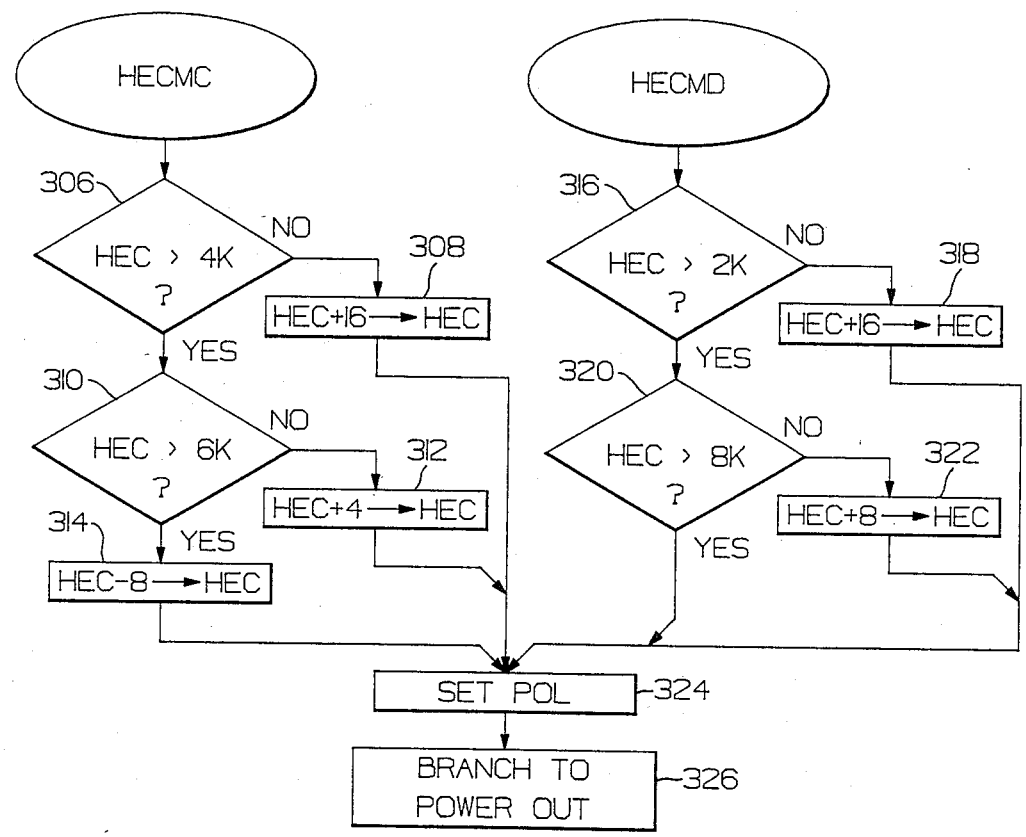

(d) HEATER ENERGY COUNTER CONTROL ROUTINE—FIGS. 10A and 10B

This routine performs the function of counter control means 48 of FIG. 2 by incrementing the heater energy counter (HEC) at the rate associated with the power level at which the heating element is operating, whenever the HEC count is less than the steady state count for that power level and decrementing the counter at a rate associated with the applicable power level when the count is greater than the steady state count for that power level. When the heating element is to be energized during the next control interval as determined by the hereinbefore described Power Compare routine, this routine is entered at one of points HECMA-HECMD depending upon the power level being applied to the heating element. When entered at one of these points the heater energy counter is incremented the predetermined appropriate number of counts. After appropriately incrementing or decrementing the heater energy counter, the power out latch (POL) is set. POL is used in the Power Out routine to control the heater control relay. When the POL is set, a signal will be generated at R4 at the beginning of the next control interval for heating element 12 to hold contacts RL1A and RL1B closed for the duration of that control interval. This routine is only entered at one of entry points HECMA-HECMD, and consequently the heater energy counter is only incremented, when the Power Compare routine determines that the heating element is to be energized during the next control interval.

Referring now to the flow diagram of FIG. 10A, if one of power levels 1-2 is selected, this routine is entered at entry point HECMA. Inquiry 270 determines whether the heater energy counter has reached the count of 1K. If the count is less than 1K, the counter is incremented 32 counts (Block 272) and the power on latch (POL) is set (Block 274). This increments the HEC at rates of 128 and 320 counts per control period for levels 1 and 2, respectively, when the count is less than 1K. Setting POL causes the heater control relay to close for the next control interval.

If the count is greater than 1K but less than 2K as determined by Inquiry 276, the heater energy counter is incremented by 8 counts (Block 278) corresponding to a rate of 32 and 80 counts per control period for levels 1 and 2 respectively and the program proceeds to Block 274.

If the count is greater than 2K signifying that the element has previously been operating at a higher power level than the presently applicable power level, Inquiry 280 determines if the count is greater than 6K. If so, the counter is decremented by 96 counts (Block 282) and the program proceeds to Block 274. This decrements the counter at rates of 384 and 960 counts per control period for power levels 1 and 2 respectively when the energy counter count is greater than 6K. If less than 6K but greater than 4K as determined by Inquiry 284, counter is decremented by 48 counts (Block 286) which decrements the counter at rates of 192 and 480 counts per control period for settings 1 and 2 respectively. If the count is greater than 2K but less than 4K, the counter is decremented by 16 counts (Block 288). This has the effect of decrementing the counter at rates of 64 and 160 counts per control period for settings 1 and 2 respectively.

If the heating element is being operated at one of levels 3, 4 and 5, this routine is entered at HECMB. Inquiry 290 determines if the count is greater than 2K. If not, the counter is incremented by 32 counts (Block 292) corresponding to rates of 576, 832 and 1344 counts per control period for levels 3, 4 and 5 respectively. If the count is greater than 2K, Inquiry 294 determines if the count is greater than the steady state count for power levels 3–5 of 4K. If not, the count is incremented by 8 counts (Block 296) corresponding to rates of 144, 208 and 336 counts per control period for levels 3, 4 and 5 respectively. If the count is greater than the steady state count, it is necessary to decrement the counter. Inquiry 298 determines if the count is greater than 6K. If so, the counter is decremented by 16 counts at Block 300 corresponding to rates of 288, 416 and 672 counts per control period for power levels 3–5 respectively. If the count is greater than 4K but less than 6K, the counter is decremented by 8 counts (Block 302) corresponding to decrement rates of 144, 208 and 336 per control period for settings 3–5 respectively.

Having incremented or decremented the counter, POL is set (Block 274) and the program branches (Block 304) to the Power Out routine.

Referring to FIG. 10B, if the heating element is being operated at power level 6 or 7, this routine is entered at entry point HECMC and Inquiry 306 determines if the energy count is greater than 4K. If not, the counter is incremented by 16 counts (Block 308) for rates of 848 and 1024 counts per control period for levels 6 and 7 respectively. If the count is greater than 4K, Inquiry 310 determines if the count is greater than the steady state count of 6K. If not, the counter is incremented by 4 counts (Block 312) for rates of 212 and 256 counts per control period for levels 6 and 7 respectively. If the count is greater than 6K, the count is decremented by 8 counts (Block 314) for decrement rates of 424 and 512 counts per control period for levels 6 and 7 respectively.

If the heating element is being operated at power level 8 or 9, this routine is entered at entry point HECMD. Inquiry 316 determines if the count is greater than 2K. If not, the counter is incremented by 16 counts (Block 318) corresponding to rates of 1536 and 2048 counts per control period for levels 8 and 9 respectively. As determined by Inquiry 320, if the count is greater than 2K but less than 8K, the steady state count for power levels 8 and 9, the counter is incremented by 8 (Block 322) corresponding to increment rates of 768 and 1024 counts per control period for the power settings 8 and 9 respectively.

Having incremented or decremented the heater energy counter, the power out latch is set (Block 324) and the program branches to the Power Out routine (Block 326).

Figure 10C:
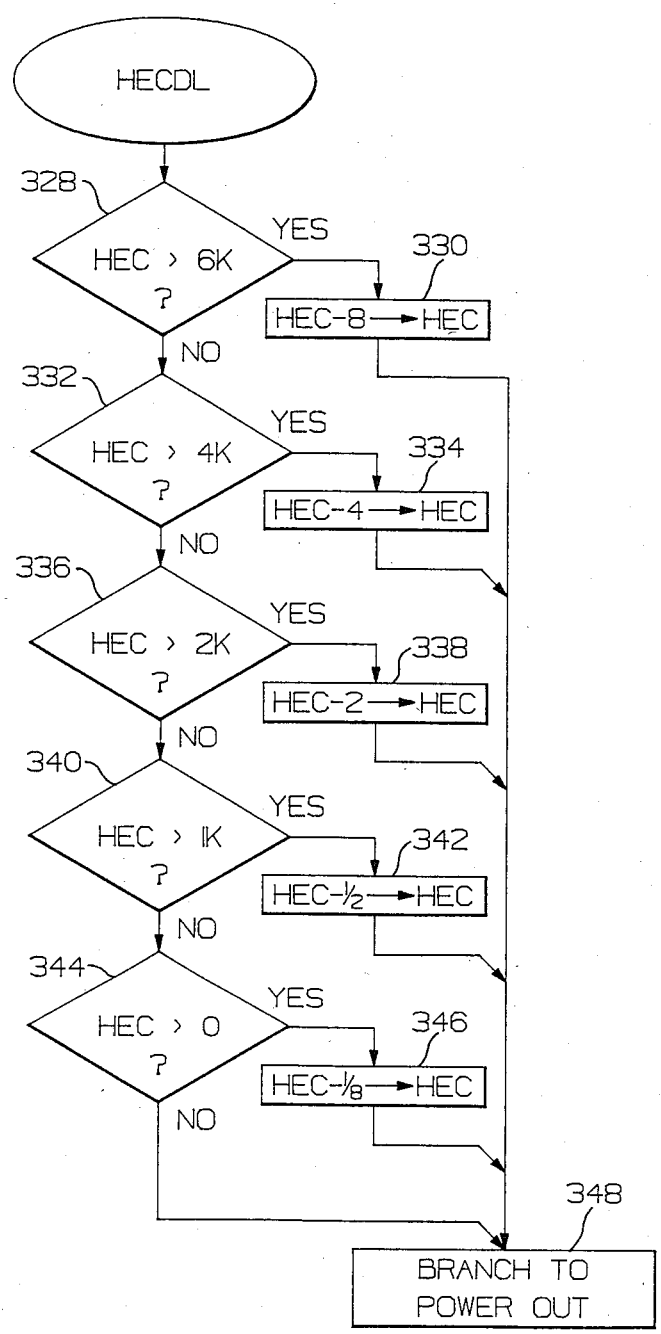

If the OFF power setting is being implemented, this routine is entered at entry point HECDL (FIG. 10C). Inquiry 328 determines if the count is greater than 6K. If so, the counter is decremented 8 counts (Block 330). This decrements the counter at a rate of 1024 counts per control period when the count is greater than 6K. If the count is less than 6K, Inquiry 332 determines if the count is greater than 4K. If so, the counter is decremented by 4 counts (Block 334) corresponding to a decrement rate of 512 counts per control period. When the count is not greater than 4K, Inquiry 336 determines if the count is greater than 2K. If so, the counter is decremented by 2 counts (Block 338) for a decrement rate of 256 counts per control period. If the count is not greater than 2K, Inquiry 340 determines if the count is greater than 1K. If so, the count is effectively decremented by $\frac{1}{2}$ count (Block 342) corresponding to a decrement rate of 64 counts per control period. If the count is not greater than 1K, Inquiry 344 determines if the count is greater than 0. If so, the counter is decremented effectively by an average of $\frac{1}{8}$ count corresponding to a decrement rate of 16 counts per control period (Block 346). After appropriately decrementing the heater energy counter, the program branches (Block 348) to the Power Out routine.

(e) POWER OUT ROUTINE—FIG. 11

The function of this routine is to generate the output signals at output ports R4–R7 for controlling relays RL1–RL4, respectively. Inquiry 350 checks the state of the Power Out Latch (POL). If set, the output port R(n) is set (Block 352). The index n identifies the output port associated with the particular heating element routine being executed. For heating elements 12–18, the associated output ports are R4–R7, respectively. Thus, for the routines for heating elements 12–18, index n equals 4–7, respectively. When R4 is set, relay contacts RL1(a) and RL1(b) are closed, enabling energization of the heating element 12. If POL is not set for heating element 12, output port R4 is reset (Block 354), thereby opening contacts RL1(a) and RL1(b) and deenergizing heating element 12.

Inquiries 356, 358, 360 and 362 check the state of port K8 to introduce a delay of two cycles of the power signal. Input port K8 receives zero crossing signals from circuit 103 (FIG. 6). Positive half-cycles are represented by K8=1 and negative half-cycles by K8=0. Following this delay the program returns (Block 364) to the Scan routine for the next heating element. Thus, the control routine for each heating element is executed once every eight cycles of the power signal to provide the desired eight-cycle control interval for each heating element.

While in accordance with the Patent Statutes, a specific embodiment of the present invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. In a household cooking appliance a power control system for controlling the power output of a heating element energized by an external power supply in response to a power setting selected by an operator from a plurality of available power settings, said control system comprising:
    power control means for operating the heating element at different selected power levels in response to the selection of different ones of the power settings, each setting having a corresponding steady state power level;
    energy counter means;
    each power setting having associated with it a corresponding predetermined steady state energy count which is approximately proportional to the steady state operating temperature of said heating element when operated at its corresponding steady state power level and a corresponding minimum threshold count less than its steady state count;
    counter control means for selectively incrementing said counter means at a rate approximately proportional to the rate of increase of the temperature of the heating element when the count is less than said steady state count for the applied power level and decrementing said counter means at a rate approximately proportional to the rate of decrease of the temperature of the heating element when the count is greater than said steady state count for the applied power level;
    said power control means including means responsive to said energy counter means operative to operate the heating element at a power level higher than the power level corresponding to the selected power setting whenever the heater energy count is less than said minimum threshold count for the selected power setting, thereby reducing the time required for the heating element temperature to rise to the steady state operating temperature in response to changes in the selected power setting from a lower setting or OFF to a higher setting.

2. The control system of claim 1 wherein at least some of the plurality of power settings have corresponding maximum threshold counts greater than said steady state counts, and wherein said means responsive to said energy counter means is further operative to operate the heating element at a power level lower than the power level corresponding to the selected power setting whenever the heater energy count is greater than said corresponding maximum threshold count, thereby reducing the time required for the heating element temperature to fall to the steady state temperature in response to a change in the selected power setting from a higher power setting to a lower power setting.

3. In a household cooking appliance a power control system for controlling the power output of a heating element energized by an external power supply in response to a power setting selected by an operator from a plurality of available power settings, said control system comprising:
    power control means for operating the heating element at different selected power levels in response to the selection of different ones of the power settings, each setting having a corresponding steady state power level;
    energy counter means;
    each power setting having associated with it a corresponding predetermined steady state energy count which is approximately proportional to the steady state operating temperature of said heating element when operated at its corresponding steady state power level;
    counter control means for selectively incrementing said counter means at a rate approximately proportional to the rate of increase of the temperature of the heating element when the count is less than said steady state count for the applied power level and decrementing said counter means at a rate approximately proportional to the rate of decrease of the temperature of the heating element when the count is greater than said steady state count for the applied power level;
    at least some of the plurality of power settings having corresponding minimum threshold counts less than said steady state counts and maximum threshold counts greater than said steady state counts;
    said power control means including means responsive to said energy counter means operative to operate the heating element at a power level higher than the power level corresponding to the selected power setting when the heater energy count is less than the minimum threshold count for the selected power setting, to operate the heating element at a power level less than the power level corresponding to the selected power setting if said energy counter is greater than said maximum threshold value for the selected power setting and to operate the heating element at the power level corresponding to the selected power setting when the count of said heater energy counter is between said minimum and maximum threshold counts, thereby reducing the time required for the heating element to reach its steady state operating temperature in response to changes in the selected power setting.

4. A power control system in accordance with claim 3 wherein said higher power level is a predetermined number of power levels higher than the power level associated with the selected power setting, or the maximum power level whichever is lower.

5. A power control system in accordance with claim 4 wherein said lower power level is a predetermined number of levels lower than the power level associated with the selected power setting or the OFF power level if the number of power levels between the selected power level and OFF is less than said predetermined number of levels.

6. A method for controlling the power output of a resistive heating element energized by an external power supply in response to a power setting selected by an operator from a plurality of available power settings which reduces the time required for the heating element to respond to changes in the power setting comprising the steps of:
    incrementing an energy counter at a rate established as a function of the power level applied to the heating element, independent of the actual heating element temperature, when the count is less than a predetermined steady state count which is approximately proportional to the steady state temperature of the heating element when operated at the applied power level, the rate being approximately proportional to the rate of increase of the heating element temperature when the heating element is operated at the applied power level;
    decrementing the energy counter at a rate which is approximately proportional to the rate of decrease of the heating element temperature when the count of the heater energy counter is greater than the steady state count for the applied power level; and operating the heating element at a power level higher than the power level corresponding to the selected power setting whenever the count of the energy counter is less than a predetermined minimum threshold count associated with the selected power setting, which minimum count is less than its steady state count.

7. A method for controlling the power output of a resistive heating element energized by an external power supply in response to a power setting selected by an operator from a plurality of available power settings which reduces the time required for the heating element to respond to changes in the power setting comprising the steps of:

incrementing an energy counter at a rate established as a function of the power level applied to the heating element, independent of the actual heating element temperature, when the count at least equals a predetermined steady state count which is approximately proportional to the steady state temperature of the heating element when operated at the applied power level, the rate being approximately proportional to the rate of increase of the heating element temperature when the heating element is operated at the applied power level;

decrementing the energy counter at a rate which is approximately proportional to the rate of decrease of the heating element temperature when the count of the heater energy counter is greater than the steady state count for the applied power level;

operating the heating element at a power level higher than the power level corresponding to the selected power setting whenever the count of the energy counter is less than a minimum threshold count associated with the selected power setting, which minimum count is less than its steady state count;

operating the heating element at a power level lower than the selected power level whenever the count of the energy counter is greater than a maximum threshold count associated with the selected power setting, which maximum threshold count is greater than its steady state count; and operating the heating element at the selected power level when the count of the energy counter is greater than the minimum threshold count and less than the maximum threshold count.

* * * * *